(12) United States Patent
Hawa

(10) Patent No.: US 9,970,553 B2
(45) Date of Patent: May 15, 2018

(54) PRESSURE BALANCING GATE VALVE

(71) Applicant: Hawa Valves (India) Private Limited, Navi Mumbai (IN)

(72) Inventor: Javed Anwar Hawa, Mumbai (IN)

(73) Assignee: Hawa Valves (India) Private Limited, Navi Mumbai (IN)

( * ) Notice: Subject to any disclaimer, the term of this patent is extended or adjusted under 35 U.S.C. 154(b) by 64 days.

(21) Appl. No.: 15/210,425

(22) Filed: Jul. 14, 2016

(65) Prior Publication Data

US 2017/0016542 A1      Jan. 19, 2017

(30) Foreign Application Priority Data

Jul. 14, 2015   (GB) .................................... 1512287.2

(51) Int. Cl.
    *F16K 3/02*        (2006.01)
    *F16K 39/04*      (2006.01)

(52) U.S. Cl.
    CPC ............ *F16K 3/0209* (2013.01); *F16K 39/04* (2013.01)

(58) Field of Classification Search
    CPC .............................. F16K 3/0209; F16K 39/04
    USPC ....... 251/326–329, 282; 137/630.12, 599.16, 137/601.12
    See application file for complete search history.

(56) References Cited

U.S. PATENT DOCUMENTS

| | | | |
|---|---|---|---|
| 523,537 A * | 7/1894 | Lunken | F16K 39/04 137/630.12 |
| 588,430 A * | 8/1897 | Hirt | F16K 11/202 137/630.12 |
| 745,774 A * | 12/1903 | Brady | F16K 39/04 137/630.12 |
| 1,932,471 A | 10/1933 | McKellar | |

(Continued)

FOREIGN PATENT DOCUMENTS

WO    WO 2015/047747 A1    4/2015

OTHER PUBLICATIONS

United Kingdom Intellectual Property Office, Search Report in United Kingdom Patent Application No. GB1512287.2, dated Oct. 7, 2015, 1 p.

*Primary Examiner* — Marina Tietjen
(74) *Attorney, Agent, or Firm* — Leydig, Voit & Mayer, Ltd.

(57) ABSTRACT

A gate valve assembly includes a valve body with an inlet and outlet, a first valve element and second valve element located between the inlet and outlet. The first valve element is engageable with and disengageable from the second valve element, which is in sliding contact with the valve body and slidable between a first position, which prevents flow from the inlet to the outlet, and a second position, which permits flow from the inlet to the outlet. The assembly provides a first flow path from the inlet to the outlet when the first valve element is disengaged from the second valve element, and a second flow path from the inlet to the outlet when the second (Continued)

valve element is moved from the first position to the second position. Upon actuator operation, initially the first valve element disengages from the second valve element to permit fluid flow through the first flow path to equalise upstream and downstream pressure on the second valve element. Further operation slides the second valve element from the first position to the second position to permit fluid flow through the second flow path.

5 Claims, 3 Drawing Sheets

(56) References Cited

U.S. PATENT DOCUMENTS

| | | | |
|---|---|---|---|
| 4,678,008 A | | 7/1987 | Gyongyossy |
| 5,199,683 A | * | 4/1993 | Le ........................ E21B 33/062 |
| | | | 137/614.17 |
| 5,370,155 A | * | 12/1994 | Gyongyossy ........... F16K 39/04 |
| | | | 137/630.12 |
| 2009/0256099 A1 | * | 10/2009 | Palmer .................. F16K 3/0209 |
| | | | 251/326 |
| 2011/0266471 A1 | | 11/2011 | Wang |
| 2013/0056670 A1 | * | 3/2013 | Palmer .................... F16K 39/04 |
| | | | 251/326 |
| 2013/0263954 A1 | | 10/2013 | McBride |
| 2015/0083954 A1 | * | 3/2015 | McEvoy ................. F16K 39/04 |
| | | | 251/282 |

\* cited by examiner

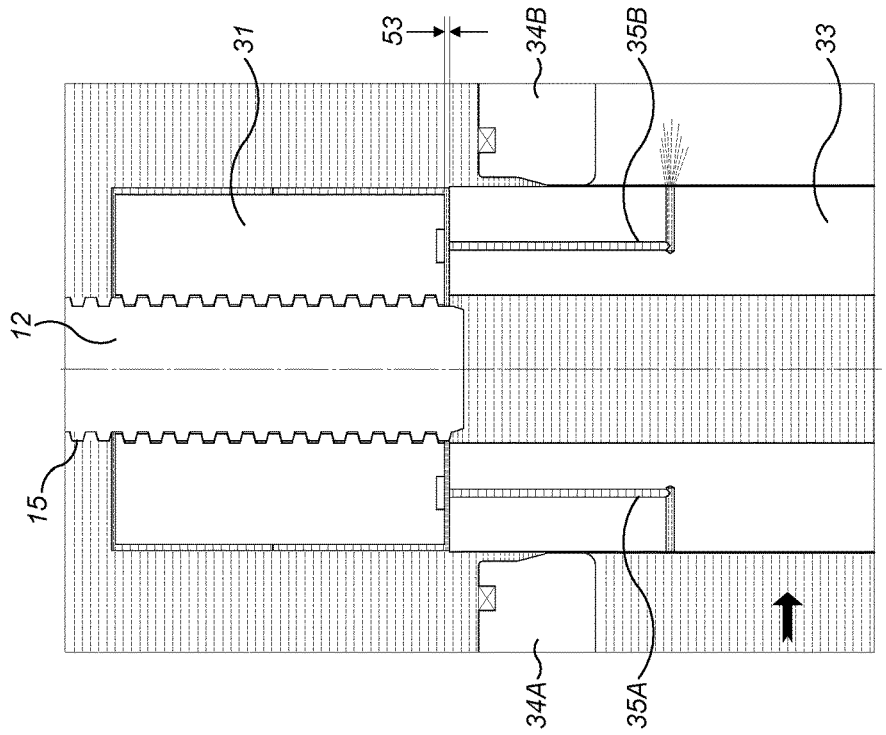
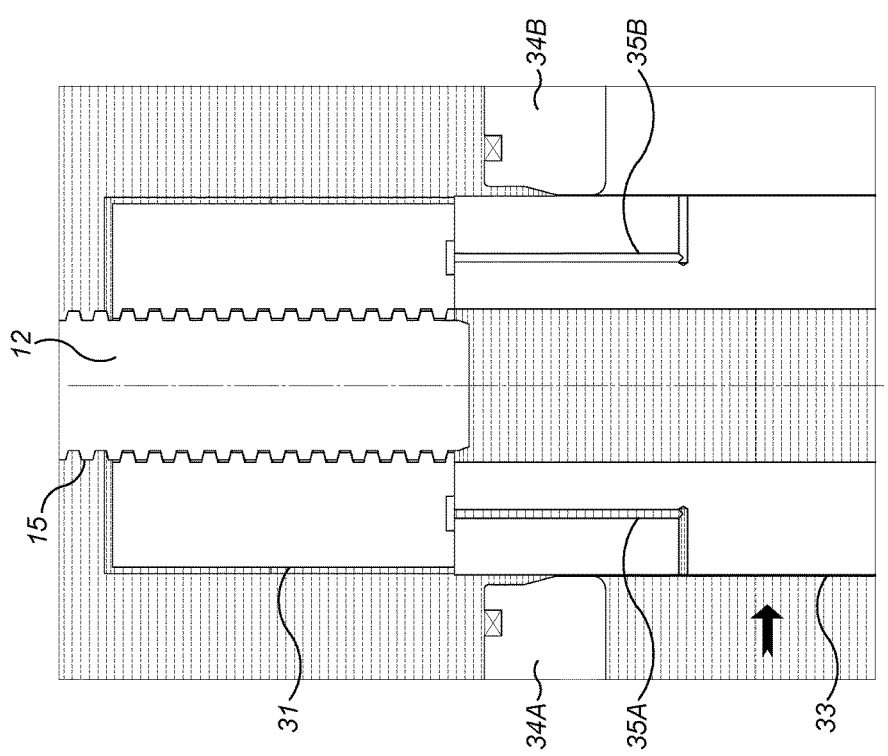
FIG. 3
FIG. 2

PRESSURE BALANCING GATE VALVE

CROSS-REFERENCE TO RELATED APPLICATIONS

This application claims priority to United Kingdom Patent Application No. 1512287.2, filed Jul. 14, 2015, which is incorporated by reference herein in its entirety for all purposes.

FIELD OF THE INVENTION AND BACKGROUND

The present invention relates to a high pressure gate valve for controlling the flow of a fluid through a pipe. Conventional gate valves comprise a gate element which is movable in a direction perpendicular to the flow of the pipe in order to allow or block the flow of a fluid. In the closed position, high pressure fluid on the inlet side collects and biases the valve towards the closed position. This can cause a condition called pressure lock, wherein the pressure build up prevents the valve from opening.

When the fluid is of a relatively low pressure, such as below 100 bar, this does not pose a problem, as it does not take much force to overcome the pressure lock caused by the fluid when it is desired to open the valve. However, when the fluid is highly pressurised the valve may become stuck in the closed position unless a very large input force is used. Highly pressurised may apply to a pressure of over 100 bar, in the present invention pressures in the order of 1000 bar are considered.

Conventional gate valves deal with this by comprising an additional valve stem with a ball screw in order to balance the pressure thrust. This is a complicated design and requires a number of moving components. Alternatively, equalising pipes and relief valves are fitted. However, these are not ideal as they complicate the process of opening the valve by requiring manual intervention as well as requiring a further piping component which may fail. Thus the installation of the valve is more complex and takes up more space.

SUMMARY OF THE INVENTION

The present invention provides a gate valve assembly comprising a valve body with an inlet and an outlet and first and second valve elements located between the inlet and the outlet, the first valve element engageable with and disengageable from the second valve element and the second valve element in sliding contact with the valve body and slidable between a first position in which the second valve element prevents flow from the inlet to the outlet and a second position in which the second valve element permits flow from the inlet to the outlet, an actuator operable to move the first and second valve elements, wherein the assembly is configured to provide a first flow path from the inlet to the outlet when the first valve element is disengaged from the second valve element, and to provide a second flow path from the inlet to the outlet when the second valve element is moved from the first position to the second position, wherein upon operation of the actuator to open the valve, initially the first valve element disengages from the second valve element to permit fluid flow through the first flow path in order to equalise upstream and downstream pressure on the second valve element, and further operation of the actuator slides the second valve element from the first position to the second position to permit fluid flow through the second flow path.

This allows the gate valve assembly to open without an excessive force input or by using external bypass components even when a high pressure fluid is flowing through the valve.

In a preferred embodiment the first flow path passes through passageways in the second valve element.

Preferably the first and second valve elements are co-axial and are secured together in a manner permitting limited axial movement between the first and second valve elements. Thus movement of the first valve element opens the first valve path, and then the first valve element moves the second valve element to open the second path.

In some embodiments the second valve element defines a recess within which the first valve element is received, and the recess is dimensioned to permit a pre-determined amount of axial movement of the first valve element relative to the second valve element. This reduces the number of attachment parts required.

In a preferred embodiment the valve body defines an intermediate chamber and when the first valve element is disengaged from the second valve element, the passageways in the second valve element are in fluid communication with each other via the intermediate chamber to provide the first flow path.

Preferably the valve body further comprises a first seat ring located between the inlet and the second valve element and a second seat ring located between the outlet and the second valve element, wherein the second valve element is in sliding contact with the first and second seat rings. The seat rings enhance the seal between the valve body and the second valve element.

In a preferred embodiment the valve assembly is symmetrical around its central axis. Such a valve is reversible which increases ease of installation, and allows use in process with flow in both directions.

Preferably the engagement between the first and second valve elements provides a first valve seat and the engagement between the second valve element and the valve body provides a second valve seat.

BRIEF DESCRIPTION OF THE DRAWINGS

The invention will now be described in detail, by way of example only, with reference to the accompanying drawings in which:

FIG. 2 is an enlarged view of the gate seat region of FIG. 1, in a closed position;

FIG. 3 is an enlarged view of the gate seat region of FIG. 1, in a partially open position.

DETAILED DESCRIPTION

Figure 1:
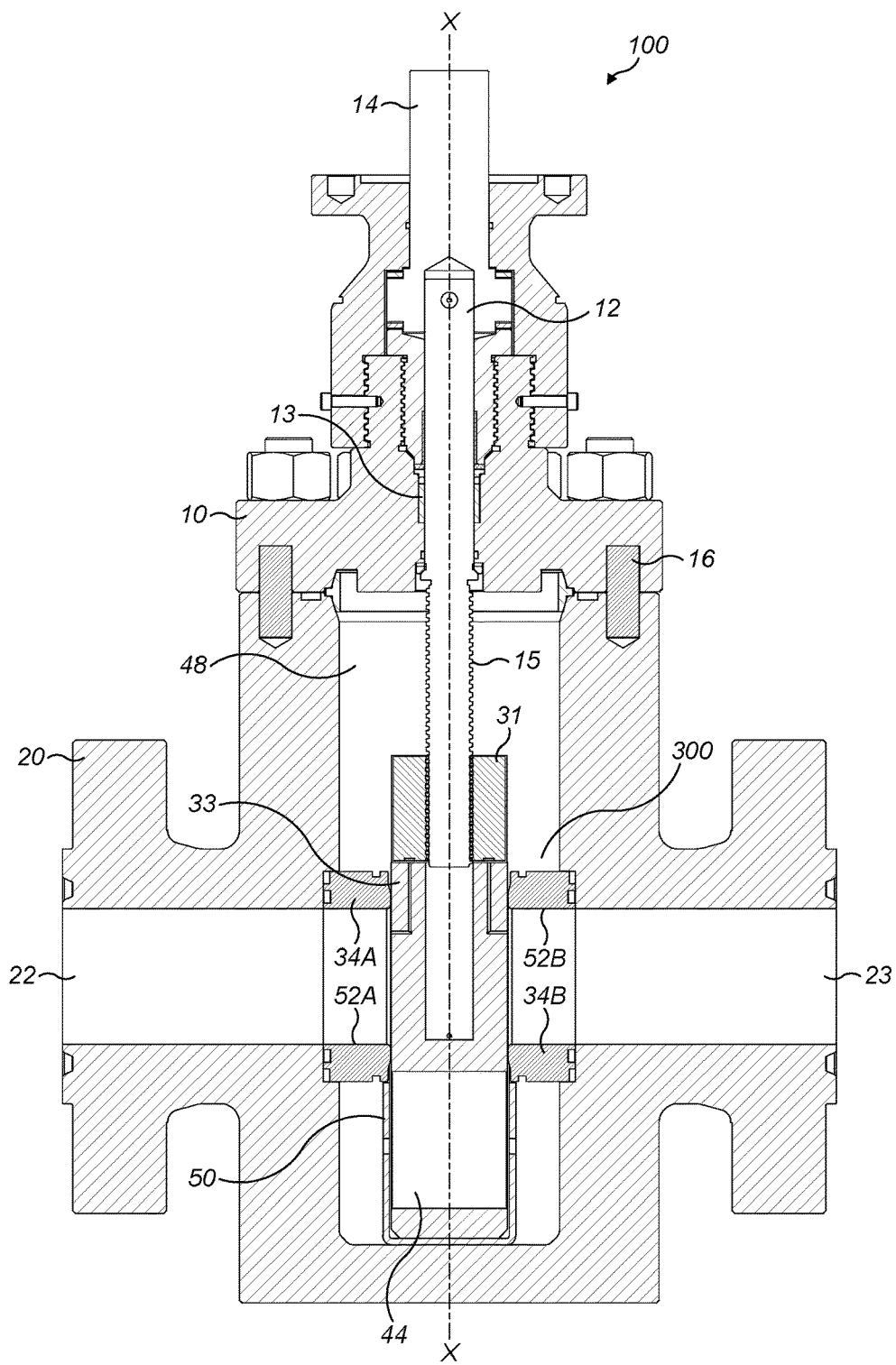
FIG. 1 is a cross-section of a gate valve assembly according to the present invention.

A first embodiment of the present invention is shown in the gate valve assembly 100 depicted in FIGS. 1 to 4. For the purposes of the following description, the upper end of the valve assembly 100 is considered to be towards the top of FIG. 1, and the lower end towards the bottom of FIG. 1. The valve assembly 100 defines a first axis X as shown in FIG. 1. The axis X extends through the length of the valve assembly 100.

A valve stem 12 is mounted within an upper valve body part, which in the present embodiment consists of a valve bonnet 10, such that the valve stem 12 is able to rotate when driven by a yoke sleeve 14 which is attached to the valve stem 12 at an upper end. Typically the rotation is driven by a handle attached to the yoke sleeve 14, but the rotation may be driven by any suitable mechanical or electrical means.

The lower end of the valve stem 12 is provided with a threaded section 15. Stem packing 13 is provided to form a seal between the valve bonnet 10 and the valve stem 12 in order to prevent material leaking from the valve assembly 100. The valve bonnet 10 is attached at its lower end to a main valve body 20, for example by dowel pins 16. The main valve body 20 comprises a valve inlet 22 and a valve outlet 23. While these are depicted as the left and right ports respectively of the valve assembly 100, this is not a requirement and the valve assembly 100 may operate with flow in either direction.

Mounted between the valve inlet 22 and the valve outlet 23 are the gate valve elements 300 which comprise a T nut 31 and a gate valve slab 33. First and second seat rings 34A, 34B are provided either side of the gate valve slab 33. These seat rings 34A, 34B each comprise a central through bore 52A, 52B which are aligned with the inlet and outlet passageways 22, 23. Each of the seat rings 34A, 34B seal against the valve body 20 on one side, and the gate slab 33 on the other. The gate slab 33 is able to move along the axis X in a central chamber 48, sliding relative to the seat rings 34A, 34B.

The gate slab 33 is further provided with a through bore 44 at its lower end. In the closed position (shown in FIG. 1) the through bore 44 is not aligned with the through bores in the seat rings 34A, 34B and hence the valve is closed. The through bore 44 is received in a gate guide 50 in this closed position.

When the gate slab 33 is raised, the gate bore 44 aligns with the through bores in the seat rings 34A, 34B to connect the inlet 22 and outlet 23 and hence the valve is in a fully open position.

Figure 4:
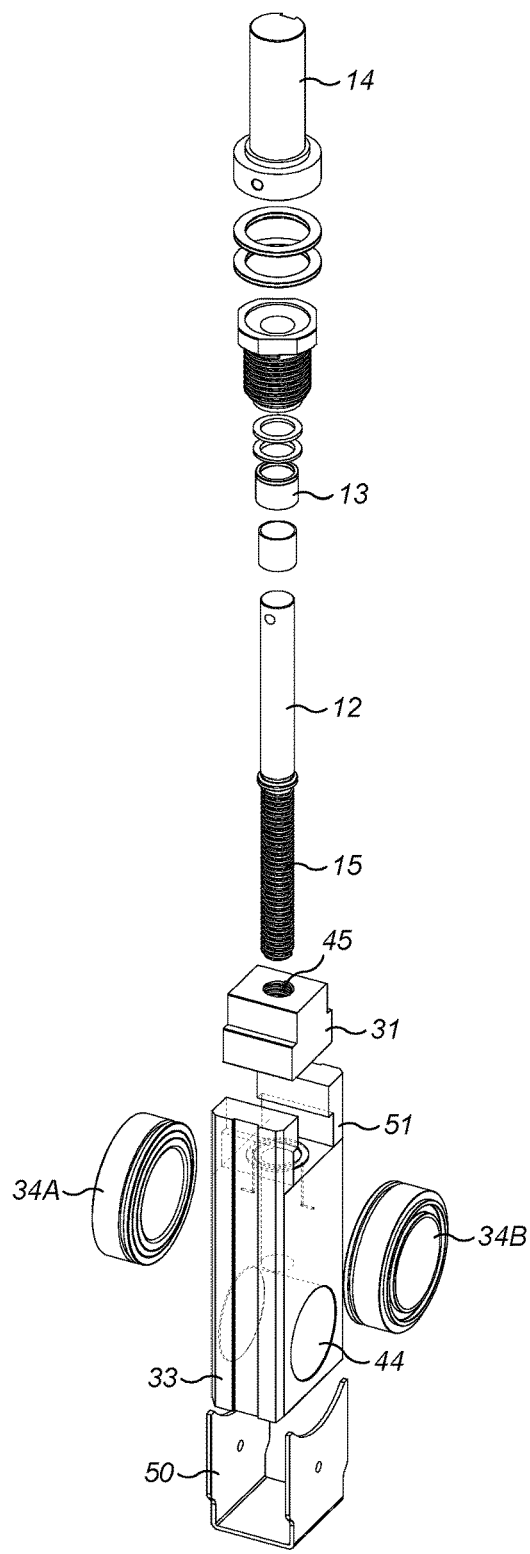
FIG. 4 is an exploded view of the interior elements of the gate valve.

The gate slab 33 is connected to the valve stem 12 by the T nut 31 as best seen in FIG. 4. The T nut 31 is an inverted T-shape and fits into a corresponding recess 51 in the top end of the gate slab 33. The T nut 31 is further provided with a threaded bore 45 which engages with the threaded section 15 of the valve stem 12. The T nut 31 is unable to rotate in the recess 51 of the gate slab 33, and the gate slab 33 is unable to rotate between the seat rings 34A, 34B. As such, when the valve stem 12 is driven to rotate by the yoke sleeve 14, the rotational motion is translated into axial motion of the T nut 31 and the gate slab 33.

The gate slab 33 further comprises channels 35A, 35B which are located so as to extend from the inlet 22 and the outlet 23 to the central chamber 48 when the gate slab 33 is in the closed position. Specifically the passageway 35A extends from the side of the gate slab 33 facing the inlet 22 to the upper surface of gate slab 33, while the passageway 35B extends from the side of the gate slab 33 facing the outlet 23 to the upper surface of the gate slab 33. The lower surface of the T nut 31 seals against the upper surface of the gate slab 33 in the closed position in order to close the passageways 35A, 35B to prevent the flow of a fluid between the inlet 22, the chamber 48 and the outlet 23. The seal between the gate slab 33 and the T nut 31 can be regarded as a first or pilot valve seat which, as described further below, is used for pressure balancing. The sliding seal between the gate slab 31 and the seat rings 34A, 34B forms a second or main valve seat which is used for the main flow through the assembly.

The operation of the valve assembly 100 will now be described with reference to FIGS. 2 and 3.

In the closed position show in FIGS. 1 and 2, fluid is present in the inlet 22 and the chamber 48 and a large pressure may form and act on the valve elements 300. This can make opening the valve assembly 100 difficult, as the initial movement of the valve elements 300 has to act against the frictional force generated by this pressure. In particular the large gate slab 33 may be hard to move as it comprises relatively large faces exposed to the pressurised fluid.

As such, when the valve stem 12 is rotated, the gate slab 33 will resist movement upwards along the X axis. However, enough play is provided between the T nut 31 and the recess 51 in the gate slab 33 that the T nut 31 is able to move upwardly a small distance within the recess 51. Thus, a small clearance 53 is formed between the lower surface of the T nut 31 and the upper surface of the gate slab 33. This partially open position is shown in FIG. 3.

With the T nut 31 disengaged from the gate slab 33, fluid is able to flow from the inlet 22 through the channel 35A into the chamber 48. From the chamber 48 the fluid is able to flow through the channel 35B toward the valve outlet 23. This will substantially equalise the pressure across the gate slab element 33. This provides a first flowpath through the valve assembly 100.

With the pressure either side of the gate valve elements 300 substantially equalised, the pressure lock force acting to bias the gate slab 33 towards the closed position will be significantly reduced or eliminated. Therefore, excessive force is no longer required in order to slide the gate slab 33 relative to the seat rings 34A, 34B. Thus, further rotation of the valve steam 12 will raise the gate slab 33 until the through bore 44 is substantially aligned with the through bores of the seat rings 34A, 34B and the inlet 22 and outlet 23 and the valve is in a fully open position in order to permit full flow of fluid through the valve assembly 100. This provides a second flowpath through the valve assembly 100.

The valve assembly 100 of the present embodiment is substantially symmetrical around the axis X. As such, the inlet 22 and outlet 23 may be reversed and the valve assembly 100 will still be functional. The operation of such a reversed valve assembly 100 is as described above, but the initial flow path would be from the outlet 23 through the channel 35B into the chamber 48. From the chamber 48 the fluid would flow through the channel 35A toward the valve inlet 22. This would provide the first flowpath through a reversed valve assembly 100. The second flowpath through the reversed valve assembly 100 would then be engaged as above, with flow in the opposite direction.

Although the interface between the valve stem 12 and the tee nut 31 is described as threaded above, this is only an exemplary embodiment. Any coupling which translates rotational movement of the valve stem 12 into linear movement of the tee nut 31 may be used.

In this manner the present invention is able to provide a gate valve assembly which can be opened without excessive force in a pressure lock scenario. It will be appreciated that the exact configuration of the valve elements and their method of disengagement of the two seats may be modified to achieve the same effect.

The invention claimed is:

1. A gate valve assembly comprising a valve body defining an intermediate chamber, an inlet and an outlet, the gate valve assembly further including first and second valve elements located within the valve body, the second valve element being disposed between the inlet and the outlet, the second valve element comprising a first passageway extending from one side of the second valve element facing the inlet to an upper surface of the second valve element and a second passageway extending from the other side of the second valve element facing the outlet to an upper surface of the second valve element, the first valve element engageable with and disengageable from the second valve element and the second valve element in sliding contact with the valve body and slidable between a first position in which the second valve element prevents flow from the inlet to the outlet and a second position in which the second valve element permits flow from the inlet to the outlet, an actuator operable to move the first and second valve elements, wherein the assembly is configured to provide a first flow path through the first and second passageways in the second valve element from the inlet to the outlet when the first valve element is disengaged from the second valve element, the first and second passageways in the second valve element being in fluid communication with each other via the intermediate chamber of the valve body to provide the first flow path, and to provide a second flow path from the inlet to the outlet when the second valve element is moved from the first position to the second position, wherein upon operation of the actuator to open the valve, initially the first valve element disengages from the second valve element to permit fluid flow through the first flow path in order to equalise upstream and downstream pressure on the second valve element, and further operation of the actuator slides the second valve element from the first position to the second position to permit fluid flow through the second flow path, the valve body further comprising a first seat ring located between the inlet and the second valve element and a second seat ring located between the outlet and the second valve element, each of the seat rings sealings against the valve body on one side and the second valve element on the other, wherein the second valve element is in sliding contact with the first and second seat rings.

2. A gate valve assembly as claimed in claim 1, wherein the first and second valve elements are co-axial and are secured together in a manner permitting limited axial movement between the first and second valve elements.

3. A gate valve assembly as claimed in claim 2, wherein the second valve element defines a recess within which the first valve element is received, and the recess is dimensioned to permit a pre-determined amount of axial movement of the first valve element relative to the second valve element.

4. A valve assembly as claimed in claim 1, wherein the valve assembly is symmetrical around its central axis.

5. A valve assembly as claimed in claim 1, wherein the engagement between the first and second valve elements provides a first valve seat and the engagement between the second valve element and the valve body provides a second valve seat.

* * * * *